Sept. 14, 1965
R. H. HILL
3,206,379
MULTI STAGE CONVECTIVE DISTILLATION SYSTEM
Filed May 31, 1962
2 Sheets-Sheet 1
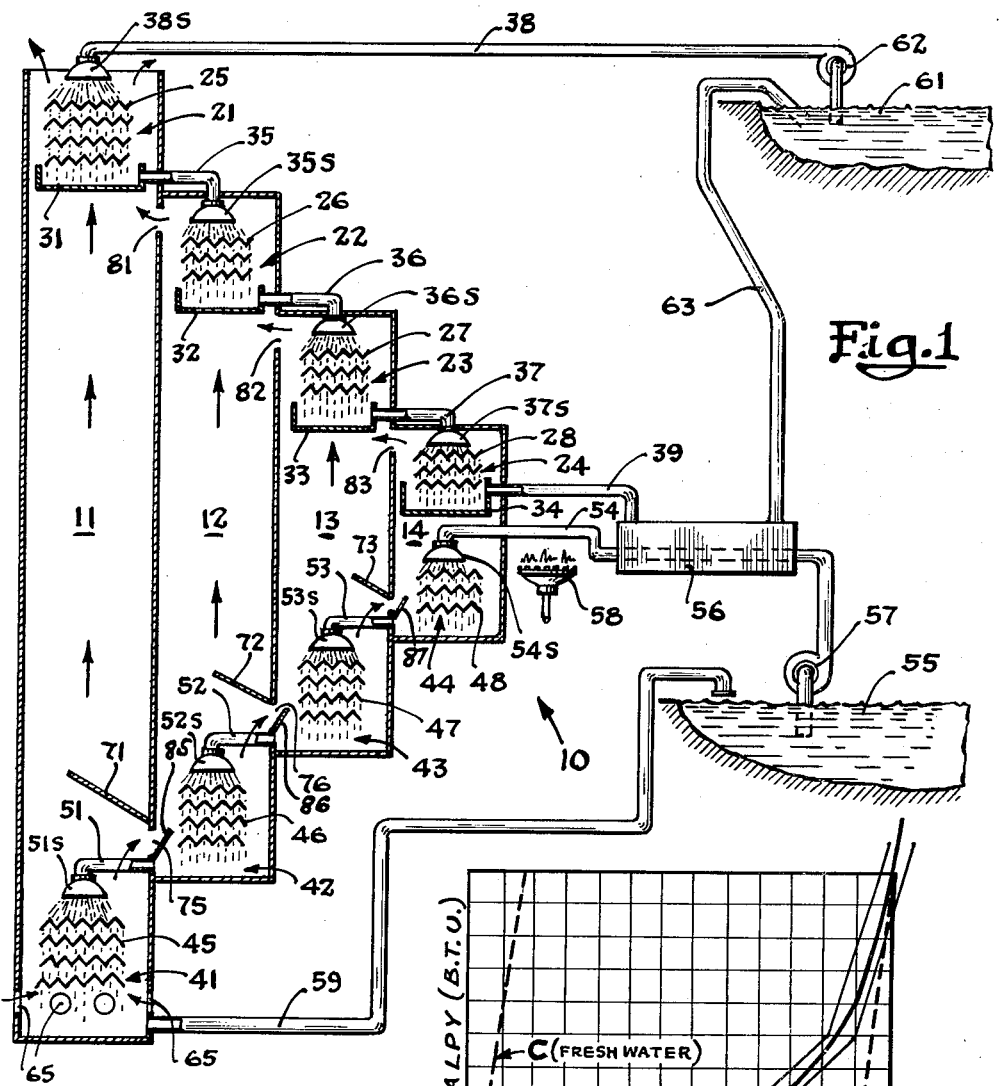
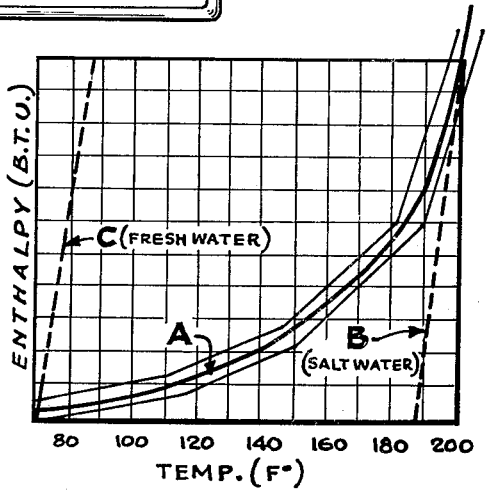
Inventor
Robert H. Hill
By Wallace, Kinzer and Dorn
Attorneys

CHAMBER -12

CHAMBER -14

CHAMBER -11

CHAMBER -13

Inventor
Robert H. Hill
By Wallace, Kinzer and Dorn
Attorneys

United States Patent Office 3,206,379
Patented Sept. 14, 1965

3,206,379
MULTI-STAGE CONVECTIVE DISTILLATION SYSTEM
Robert H. Hill, Rte. 1, Box 3, South Elgin, Ill.
Filed May 31, 1962, Ser. No. 199,103
10 Claims. (Cl. 202—46)

This invention relates to a new and improved method and apparatus for producing a substantially purified condensate liquid from a base liquid containing impurities removable by evaporation. More particularly, the invention relates to a method and apparatus for economically de-salting sea water.

The oldest and still most widely used method of de-salting or "purifying" sea water is simple distillation. It requires approximately 1,150 British thermal units of heat (B.t.u.) to heat one pound of water to its boiling point, and vaporize it, depending upon the initial temperature of the water. Consequently, conventional distillation requires excessive quantities of heat in order to de-salt an appreciable quantity of sea water.

To reduce the heat consumption, in conventional distillation, some plants have been constructed in multiple stages. In plants of this kind, the condensating vapor is used to heat and vaporize additional liquid at a lower pressure. Distillation plants have been built with up to nine stages of sequentially lower pressure. Further additional stages are usually uneconomical due to heat transfer losses from the distillation equipment and to the complexity of its construction. This is particularly true where high initial pressures are entailed.

Other methods of de-salting sea water have also been proposed. Among these are ion-exchange systems which are effective to precipitate the salts from the water. In addition, effective de-salting has been accomplished by techniques involving freezing and subsequent thawing of the sea water. Nevertheless, despite substantial expenditures in research and development, de-salting of sea water to produce water suitable for domestic and industrial use remains an expensive procedure.

The present invention, in effect, utilizes the basic method entailed in the natural evaporation and transfer of water from the seas to the land. That is, the water is evaporated into a stream of gas or air at temperatures below the boiling point of the water, and is subsequently condensed. The resulting condensate is substantially purified, being essentially free of salts and other similar impurities. The natural process is relatively wasteful of heat and space, but the present invention adapts this process to economic use by controlling and channeling the forces involved. Because the salt water or other liquid is never brought to boiling temperature, in the practice of the present invention, distillation is not actually utilized. For this reason, the invention is referred to hereinafter as a method and apparatus for liquid conversion and the term "conversion" shall mean a process entailing vaporization below the boiling point of the liquid followed by condensation of the resultant vapor.

It is an object of the present invention, therefore, to provide a new and improved method and apparatus for liquid conversion in which vaporization is carried out below the boiling point of the base liquid without entailing excessive heat losses.

Another object of the invention is to afford a relatively efficient method and apparatus for conversion of a base liquid containing impurities removable by vaporization that may nevertheless be operated at atmospheric pressure or other relatively low pressures.

It is a specific object of the invention to convert sea water or other base liquid to a substantially purified form, operating at temperatures below the boiling point of the liquid, under conditions in which a carrier gas, preferably air, is utilized to convey the vaporized liquid from an evaporation point to a condensation point, and to vary the effective volume of gas present at different stages of the process or apparatus to increase the efficiency thereof.

A specific object of the invention is to afford a continuous liquid conversion process and apparatus that may be operated at approximately atmospheric pressure yet which follows closely the enthalpy-temperature characteristic of the liquid.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is a schematic cross-sectional view of a liquid conversion apparatus constructed in accordance with one embodiment of the present invention;

FIG. 2 illustrates the normal enthalpy-temperature characteristic for saturated water vapor, in air at atmospheric pressure, together with additional operating characteristics used to explain the present invention.

Figure 5:
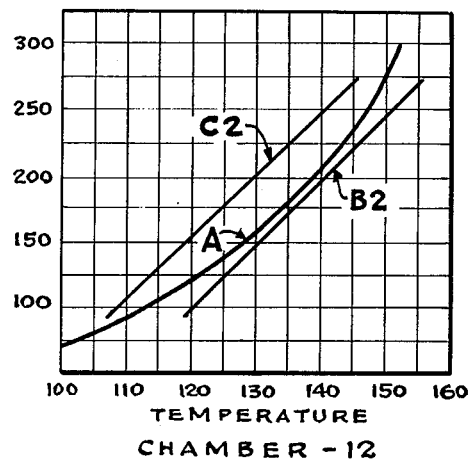
FIGS. 3, 4, 5 and 6 are reproductions of portions of the graph of FIG. 2, drawn to an enlarged scale to better illustrate the required operating conditions of the invention.

The conversion apparatus 10 illustrated in FIG. 1, which comprises one embodiment of the present invention, includes a series of four spray towers 11, 12, 13 and 14 sometimes referred to hereinafter as conversion chambers. Chambers 11, 12, 13 and 14 are of successively diminishing volume. The first chamber, chamber 11, includes a condensation section 21 located at the top of the tower. The three succeeding chambers 12, 13 and 14 are provided with similar condensation sections 22, 23 and 24 respectively. In a sea-water purification system, as illustrated, all of the conversion chambers are filled with air. If the base liquid being processed is not chemically inert with respect to air, however, it may be necessary to use another carrier gas.

The condensation section 21 of the conversion chamber 11 includes a plurality of porous distributor baffles 25 disposed in stacked array within the condensation section and preferably spaced vertically from each other. A similar group of porous distributor baffles 26 is incorporated in the condensation section 22 of chamber 12 and corresponding groups of baffles 27 and 28 are disposed within the condensation sections 23 and 24 of chambers 13 and 14 respectively.

The lower ends of condensation sections 21, 22, 23 and 24 are provided with condensate collection pans 31, 32, 33 and 34 respectively. Collection pan 31 is connected, through a conduit 35, to a spray head 35S located in the next succeeding condensation section 22. Similarly, a conduit 36 and a spray head 36S connect pan 32 to condensation section 23, whereas a conduit 37 and a spray head 37S connect pan 33 to condensation section 34. It is thus seen that the collecting pans 31–33, together with the conduits 36–37 and the spray heads 35S–37S, afford a means for collecting liquid condensate from the condensation section of each of the chambers 11–13 and for discharging the collected liquid into the condensation section of the next succeeding chamber in the series. In addition, a spray head 38S, connected to a conduit 38, is located within the condensation section 21 of the first conversion chamber 11, whereas a discharge conduit 39 is connected to the final collecting pan 34.

Each of chambers 11–14 includes a vaporization section that is in communication with the condensation section of the chamber. The vaporization sections for chambers 11, 12, 13 and 14 are designated, respectively, by reference numerals 41, 42, 43 and 44. The vaporization sections are quite similar to the condensation sections, insofar as construction is concerned. Thus, vaporization sections 41, 42, 43 and 44 are each provided with a plurality of spaced porous distributor baffles 45, 46, 47 and 48, respectively.

Vaporization section 41 of chamber 11 is provided with a spray head 51S connected to a conduit 51 which is in communication with the bottom portion of vaporization section 42 in the adjacent spray tower 12. A spray head 52S is connected by a conduit 52 to the base portion of vaporization section 43 in chamber 13, this spray head being located in the vaporization section of chamber 12. Similarly, the base portion of the final-stage vaporization section 44 is connected by a conduit 53 and a spray head 53S to the vaporization section 43 of the preceding conversion chamber 13. Accordingly, it is seen that the conduits 51–53 and the spray heads 51S–53S constitute a means for discharging collected liquid from the vaporization section of each conversion chamber into the corresponding section of the next preceding chamber in the series 11–14.

The inlet for introducing salt water or other base liquid into conversion apparatus 10 comprises a conduit 54 that extends from a salt water reservoir 55 through a heat exchanger 56 to a spray head 54S that is located in the vaporization section 44 of the final chamber 14 of the system. A pump 57 may be incorporated in series with the conduit 54 to pump water from the salt water reservoir 55 into the conversion apparatus. In addition, a heating station 58 is located at an intermediate point along conduit 54, preferably being interposed between heat exchanger 56 and conversion chamber 14. A drain line 59 connects the initial spray tower or liquid conversion chamber 11, and specifically its vaporization section 41, back to the salt water reservoir 55.

Liquid conversion apparatus 10 further includes a fresh water or condensate input comprising conduit 38, which is connected to a fresh water reservoir 61 through a pump 62. The condensate (fresh water) outlet for the system comprises conduit 39, which is passed through the heat exchanger 56 and connected by a further conduit 63 back to the fresh water reservoir. It may be necessary to afford an additional pump in conduit 63 or in conduit 59, or both, depending upon the relative elevations of different portions of the apparatus.

Apparatus 10 utilizes a carrier gas, usually air, in carrying out the method of the present invention. Moreover, the system is operated essentially at atmospheric pressure. The base portion of vaporization section 41 in the first spray tower 11 is provided with suitable inlets 65 to admit air into the system. The condensation section 21 of conversion chamber 11, on the other hand, is vented to the atmosphere. Alternatively, a recirculation connection could be made from condensation section 21 to the inlets 65 in vaporization section 41 to afford a closed system, as would be required using a carrier gas other than air. However, it should be emphasized that the method and apparatus of the present invention operates effectively and efficiently at relatively low pressures, preferably approximately at atmospheric pressure, avoiding any necessity for heavy and relatively expensive pressurized distillation chambers.

The condensation and vaporization sections 21 and 41 of spray tower 11 are in direct communication with each other through the central portion of the tower. A baffle 71 is preferably located in the lower portion of the conversion chamber immediately above an opening 75 that permits movement of air from vaporization section 41 of the first conversion chamber 11 into vaporization section 42 of the second spray tower 12. A similar construction is carried out in the remaining series of conversion chambers. Thus, evaporation section 42 is connected to evaporation section 43 through an opening 76 with a baffle 72 being disposed above opening 76 in chamber 12. The opening from vaporization section 43 of chamber 13 to vaporization section 44 of the next succeeding chamber is identified by reference character 77 and a baffle 73 is located immediately above opening 77.

A series of adjustable dampers 85, 86 and 87 are provided for the openings 75, 76 and 77 respectively. Dampers 85–87 are individaually adjustable, independently of each other, and afford a means to regulate the flow of air from the vaporization section of each spray tower to the vaporization section of the next succeeding tower.

A reverse flow of air from each chamber to the preceding chamber in the series 11–14 is permitted in the condensation sections thereof. Thus, condensation section 22 is vented back to section 21 by an opening 81. An opening 82 permits air, after passing through condensation section 23, to circulate back from this condensation section to the next preceding condensation section 22. A vent opening 83 allows the circulation of the air or other carrier gas back from condensation section 24 to section 23.

In the operation of liquid conversion apparatus 10, FIG. 1, salt water is pumped from reservoir 55 by pump 57 and is first passed through heat exchanger 56, the operation of which is explained in greater detail hereinafter. Beyond the heat exchanger, the salt water is further heated at heating station 58, preferably at a temperature just below the boiling point of the sea water. Thus, in a preferred arrangement described hereinafter, the temperature of the sea water is raised, at heating station 58, to approximately 205° F. The heated salt water is delivered to spray head 54S and is discharged into vaporization section 44 of the final conversion chamber 14, passing downwardly through the porous distributor baffles 48 and being collected at the bottom of vaporization section 44. As the heated sea water passes downwardly through vaporization section 44, a portion thereof is evaporated into the air or other carrier gas present in the chamber.

This procedure continues through vaporization sections 43, 42 and 41. In each vaporization section, the warm salt water from the preceding vaporization section is dispersed through the vaporization section to facilitate and accelerate release of water vapor into the circulating air. Of course, the sea water is cooled in each succeeding stage of vaporization, so that the temperature of the salt water is lower as it is discharged into each preceding conversion chamber. This process is terminated in vaporization section 41 of chamber 11, from which the salt water is discharged back to reservoir 55 by means of conduit 59. The exit temperature of the salt water may vary, depending upon the number of stages in apparatus 10 and the rate of flow of the water between the sequential spray towers of the system. By way of example, the discharge temperature of the salt water may be of the order of 75° F., but it should be understood that this is exemplary only and is not critical to the present invention.

Fresh, relatively cold condensate (fresh water) is at the same time discharged, by means of pump 62, conduit 38, and spray head 38S, into condensation section 21 of conversion chamber 11. Typically, the temperature of the fresh water discharged into the first conversion chamber may be of the order of 65° F. In any event, and as explained more fully hereinafter, the temperature of the fresh water introduced into spray tower 11 should be and will necessarily be below the temperature of the salt water discharged from vaporization section 41 of chamber 11. The fifteen degree differential given as an example in this instance provides relatively efficient and effective operation, but this differential can be reduced, as will be apparent from the more detailed description of the invented method incorporated hereinafter, particularly if the conversion apparatus includes more than four stages.

The temperature differential between the condensation section 21 and the vaporization section 41 of the first chamber 11 causes the air or other carrier gas in the chamber to rise. Thus, the air passes around baffle 71 and upwardly from the vaporization section to the condensation section. The rising air carries with it water vapor evaporated from the salt water spray in vaporization section 41, and this vapor condenses on the falling droplets of the cooler fresh water being sprayed through condensation section 21. The condensing liquid from the salt water vapor increases the temperature of the fresh water collected in pan 31, as compared with the temperature of the fresh water discharged into condensation section 21 from spray head 38S. Further, the fresh water sprayed through condensation section 21 is heated by the rising warm air in the spray tower.

The water discharged from collection pan 31, through conduit 38 and spray head 38S, into the condensation section 22 of the next distillation chamber 12 is, as noted above, at a somewhat higher temperature than the fresh water originally introduced into system 10. For example, the fresh water temperature may now be of the order of 75° F. However, the temperature of the fresh water spray in condensation section 22 is still less than the temperature of the sea water being sprayed through the vaporization section 42 of conversion chamber 12. Thus, there is again a substantial temperature gradient between the ends of the spray tower. Accordingly, the air within the tower rises and carries water vapor from vaporization section 42 upwardly to condensation section 22, where the vapor condenses on the droplets of cooler fresh water being sprayed through the condensation section.

Circulation of the carrier air through distillation chamber 12 is materially assisted by the provision of openings 75 and 81 at the base and top, respectvely, of the tower. Thus, air is drawn upwardly through opening 75, being heated by the salt water spray in vaporization section 42 of chamber 12. This air moves upwardly, carrying water vapor evaporated from the salt spray, and passes out through opening 81 after having passed through condensation section 22. From opening 81, the convection currents in the distillation apparatus carry the air further upwardly through condensation section 21 of the first tower, with the result that additional water vapor is condensed in the colder fresh water spray in section 21.

The same procedure continues in the fiinal two stages 13 and 14 of the conversion apparatus. In each instance, the carrier gas (air) moves upwardly through the conversion chamber, picking up water vapor in the vaporization section of the chamber. This water vapor is condensed out in the condensation section of the chamber. Moreover, in each instance, the same air is vented back into the preceding chamber, and particularly into the condensation section thereof, to continue the condensation process.

From the foregoing, it will be seen that the fresh water is increased in temperature as it passes from each conversion chamber to the succeeding chamber in the series. On the other hand, the temperature of the salt water is lowered each time it passes from the condensation section of a given conversion chamber to the condensation section of the preceding chamber. Preferably, the temperature differential in the individual sections is not constant, but is varied as described more fully hereinafter in connection with FIGS. 2–6. Moreover, the total quantity of the mixture of water vapor and air present in each chamber is varied inversely with respect to the absolute temperature within that chamber.

The temperature of the fresh water discharged from collecting pan 34 in the final stage of system 10 is relatively high and, for example, may be approximately 195° F. Ordinarily, this temperature is much higher than the temperature of the salt water available from reservoir 55. It is for this reason that the condensed or fresh water discharged from the conduit 39 is first passed through heat exchanger 56, before being discharged to reservoir 61 by means of conduit 63. As much heat as possible is transferred from the fresh water to the salt water, in heat exchanger 56, in order to improve the efficiency of overall operation of system 10. Heat exchanger 56 may be of conventional construction, known devices of this kind being quite capable of increasing the temperature of the incoming fluid to within 5° F. of the heating fluid.

In FIG. 2 the enthalpy (heat content) of a saturated mixture of air and water vapor at atmospheric pressure is plotted as a function of temperature, curve A. At low temperatures, curve A shows a relatively small increase in enthalpy with increasing temperature. As the saturated mixture of air and water vapor rises in temperature, however, enthalpy increases progressively until at the boiling point of water the slope of the curve is essentially infinite.

In FIG. 2, plot B represents the relationship of heat capacity to temperature for relatively hot water, allowing for heat transfer from the water to the vapor, as occurs in the evaporation chambers of system 10 (FIG. 1). For heat transfer from the vapor to the cooler fresh water, a further plot C is shown in FIG. 2. Curves B and C are each approximately straight lines and, if the amounts of fresh water and salt water are approximately equal, as they should be for optimum heat transfer, these lines are essentially parallel to each other. Plots B and C, however, represent a relatively low-efficiency condition for evaporation, as might be achieved by a single-stage evaporation and condensation process.

If the water line B is not confined to that part of the enthalpy curve to the right of and below the saturated vapor curve A, as shown in FIG. 2 in a single-stage system, there would not be enough heat available to saturate the vapor-air mixture. The two plots B and C for a single-stage process, however, are so apart as to represent very little effective heat transfer from the salt water to the fresh water. Thus, if hot salt water (curve B) were to enter the conversion chamber at 205° F. it would be cooled only to approximately 190° F. while the fresh water entering at approximately 70° F. would be warmed only to 85° F. The fresh water passing through the heat exchanger 56, in a single-stage system, would only warm the salt water to about 80° F. Consequently, the heating station 58 would be required to add a large amount of heat to the salt water, making the single-stage system quite inefficient from the standpoint of heat consumption.

To attain practical efficiency in the system of the present invention, the quantity of water vapor circulating relative to the quantity of dry air present must be different in different parts of the conversion cycle. In fact, at least three stages should be employed for the conversion process, and a four-stage system (FIG. 1) is substantially better than a three-cycle operation. It would be possible to vary the volume of water while maintaining a constant quantity of air in each of the multiple stages of system 10, but this is a complex and difficult procedure to follow. Instead, system 10, in accordance with the present invention, varies the quantity of air present while the amount of water circulating through the system remains constant. Thus, the quantity of salt water and fresh water present in each of conversion chambers 11, 12, 13 and 14 is approximately constant, but the weight and volume of air present in chamber 11 is much greater than the amount of air present in the adjacent chamber 12, and a corresponding relation is established in the succeeding stages of the system.

Figure 3:
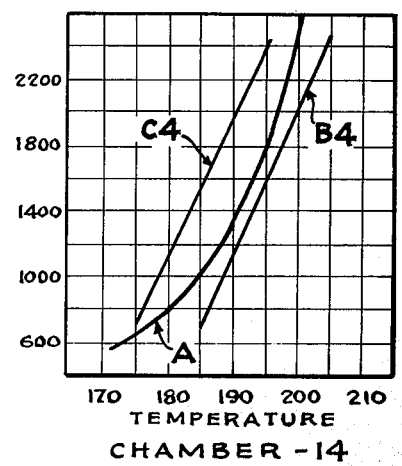

Operation of system 10, which is illustrative of one example of the method of the present invention, is shown graphically in FIG. 2 and in the larger-scale illustrations of FIGS. 3–6. As shown in FIGS. 2 and 3, the heated salt water enters the system at approximately 205° F. and leaves evaporation section 44 of chamber 14 at a temperature of about 185° F. This relationship is shown by curve B4. In the same chamber, the colder fresh water enters condensation section 24 at about 175° F. and is heated, before flowing from the conversion chamber, to approximately 195° F., as indicated by curve C4. In chamber 14, the air/water vapor relationship is approximately 40 pounds of water (fresh and salt) per pound of dry air.

Figure 4:
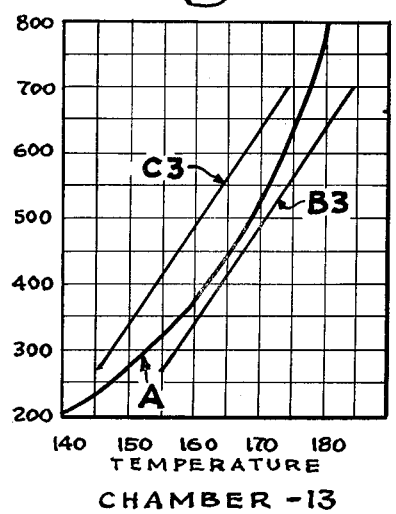

FIG. 4 illustrates the conditions obtaining in chamber 13. Salt water enters this chamber, and specifically evaporation section 43, at a temperature of about 185° F., this being the temperature to which the salt water has been cooled in the preceding conversion chamber. As shown by curve B3, the salt water is cooled to approximately 155° F. The heating effect on the fresh water in this chamber, in condensation section 23, is indicated by curve C3. The fresh water enters the chamber at about 145° F. and is heated to approximately 175° F. before being transferred to the next succeeding condensation section 24. To achieve this result, a substantially greater volume of air is present in relation to the amount of water, the relationship in this instance being approximately ten pounds of water for each pound of air.

Figure 6:
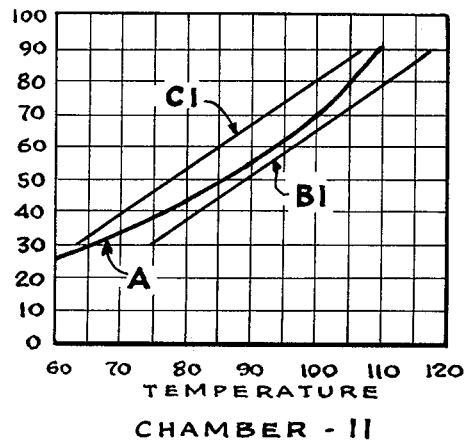

FIG. 5 shows conditions in chamber 12. As indicated by curve B2, the entrance and exit temperatures for the salt water are approximately 155° F. and 117° F., respectively. The corresponding fresh water temperatures (curve C2), are approximately 107° F. and 145° F. Here, however, even more air is present in relation to the water available, the ratio now being approximately four to one. FIG. 6 illustrates operating conditions for the initial conversion chamber, spray tower 11. As indicated by curve B1 in FIG. 6, the entering temperature of the salt water is approximately 117° F. and the discharge temperature is about 75° F. The fresh water, on the other hand, is admitted to chamber 11 at approximately 65° and this water is heated to about 107° F. as it passes through the chamber, as shown by curve C1. In the initial liquid conversion chamber 11, the ratio of water to air is even lower, being approximately 1.5:1. The individual curves B1–B4 and C1–C4 are all reproduced in FIG. 2 to illustrate the overall operating characteristics of the four-stage purification system 10.

With evaporation and condensation distributed in a plurality of stages, as in FIG. 10, the heat drop over the entire system can be reduced to approximately 10° F. or less, as is illustrated in FIG. 2. There is a further heat drop in the heat exchanger 56, of course, since the heat exchanger cannot operate at 100% efficiency. This heat loss may be of the order of 5° F., giving a total heat requirement of approximately 15° F. or fifteen B.t.u. per pound of water supplied to the evaporating system. Each pound of salt water cools approximately 120° as it traverses the conversion system, resulting in a loss of about 120 B.t.u. per pound. 10 B.t.u. of this loss goes to warm the air within the system and the remainder evaporates water. Thus, for ten pounds of salt water circulated through the system, the present invention provides for evaporation of approximately one pound with a net heat addition in the system of approximately 150 B.t.u. per pound of water evaporated and subsequently condensed. The total heat requirement of the system, accordingly, is of the order of 1200 B.t.u. per gallon, affording quite low operating costs as compared with conventional systems despite the relative simplicity of the system and the inexpensive construction that may be employed in system 10.

The method and apparatus of the present invention afford an efficient and effective liquid conversion operation carried out below the boiling point of the water or other liquid to be purified without entailing excessive heat losses. Nevertheless, the system and method provide for operation at atmospheric pressure, or other relatively low pressure levels. Efficient operation is made possible by effectively varying the quantity of air present in relation to the quantity of water present in each of the several stages of the conversion process in order to achieve an operation which follows closely the enthalpy-temperature characteristic of the liquid.

In the foregoing description of the invention, the transfer of water vapor from the point of evaporation to the point of re-condensation is effected by convection currents in the carrier gas (air) used. However, the convection currents can be assisted, or even substantially over-ridden, by a forced air circulation system. As an example of a system of this kind, it may be considered that conversion chambers 11–14 may be constructed as bubble towers, instead of the illustrated spray towers, while still retaining the major advantages of the invention.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A liquid conversion method for producing a substantially purified condensate liquid from a base liquid containing impurities removable by vaporization, in the presence of a carrier gas and at a predetermined pressure, comprising:

heating the base liquid to a temperature just below the boiling temperature thereof;

transferring the heated base liquid in a given direction through a series of conversion chambers in a manner permitting appreciable evaporation and cooling of the base liquid in each such chamber;

transferring previously purified liquid condensate from a relatively low-temperature source through said series of chambers in the reverse direction in a manner to effect appreciable condensation of vapor from said base liquid in said condensate to increase the amount and temperature of the condensate;

and progressively varying the amount of carrier gas present in said chambers, relative to liquid present, as the base liquid is transferred from chamber to chamber to maintain the maximum and minimum temperature of condensate and base liquid close to but above and below, respectively, the enthalpy-temperature characteristic of a saturated mixture of vaporized condensate and the carrier gas and thereby minimize heat losses in the conversion process.

2. A liquid conversion method for producing a substantially purified liquid condensate from a base liquid containing impurities removable by vaporization, in the presence of a carrier gas and at a predetermined pressure, comprising:

heating the base liquid to a temperature just below the boiling temperature thereof;

transferring the heated base liquid in a given direction through a series of interconnected conversion chambers of progressively increasing volume in a manner permitting appreciable evaporation and cooling of the base liquid in each such chamber;

transferring previously purified liquid condensate from a relatively low temperature source through said series of chambers in the reverse direction in a manner to effect appreciable condensation of vapor from said base liquid in said condensate to increase the amount and temperature of the condensate;

and controlling the rate of flow of base liquid and condensate through said chambers to maintain the maximum and minimum temperatures of condensate and base liquid at an approximately constant differential in each chamber, with the temperatures of the base liquid and condensate being close to but above and below, respectively, the enthalpy-temperature characteristic of a saturated mixture of vaporized condensate and the carrier gas to minimize heat losses in the conversion process.

3. A liquid conversion method for producing a substantially purified liquid condensate from a base liquid containing impurities removable by vaporization, in the presence of a carrier gas and at a predetermined pressure, comprising:

heating the base liquid to a temperature just below the boiling temperature thereof;

transferring the heated base liquid in a given direction through a series of interconnected conversion chambers of progressively increasing volume each filled with carrier gas;

dispersing the base liquid in each conversion chamber to effect appreciable evaporation of the base liquid into the carrier gas in each such chamber, with resultant progressive cooling of the unevaporated base liquid dispersed into the next chamber;

transferring previously purified liquid condensate from a relatively low temperature source through said series of chambers in the reverse direction;

dispersing the condensate in each chamber to effect appreciable condensation of vapor from said base liquid in said condensate to increase the amount and temperature of the condensate;

and controlling the rate of flow of base liquid and condensate through said chambers to maintain the maximum and minimum temperatures of condensate and base liquid at a relatively small differential in each chamber, with the temperatures of the base liquid and condensate close to but above and below, respectively, the enthalpy-temperature characteristic of a saturated mixture of vaporized condensate distillate and the carrier gas to minimize heat losses in the process.

4. A method for producing fresh water from salt water, using air as a carrier gas, at a predetermined pressure, comprising:

heating the salt water to a temperature just below its boiling point;

transferring the heated salt water in a given direction through a series of conversion chambers filled with air near atmospheric pressure;

dispersing the salt water in each conversion chamber to effect appreciable evaporation and cooling of the salt water in each such chamber;

transferring fresh water from a relatively low temperature source through said series of chambers in the reverse direction, starting at a temperature much lower than the boiling point;

dispersing the fresh water in each chamber to effect appreciable condensation of water vapor from the air in the chamber into the fresh water to increase the amount of the fresh water and to heat the fresh water;

and providing substantially greater quaitities of air, relative to liquid, in the successive chambers of said series to which said salt water is transferred to maintain the maximum and minimum temperatures of the fresh and salt water at an approximately constant differential in each chamber, with the temperatures of the salt water and fresh water close to but above and below, respectively, the enthalpy-temperature characteristic of a saturated mixture of air and water vapor to minimize heat losses in the process.

5. A liquid conversion method for producing a substantially purified condensate liquid from a base liquid containing impurities removable by vaporization, in the presence of a carrier gas and at a predetermined pressure, comprising:

heating the base liquid to a temperature just below the boiling temperature thereof;

transferring the heated base liquid in a given direction through the base portions of a series of conversion chambers of progressively increasing volume, filled with carrier gas, in a manner permitting appreciable evaporation from the base liquid to the carrier gas, and resultant cooling of the base liquid, in each such chamber;

transferring previously purified liquid condensate, from a relatively low-temperature source, through the top portions of said series of chambers in the reverse direction in a manner to effect appreciable condensation of vapor from said carrier gas into said condensate to increase the amount and temperature of the condensate;

and controlling the rate of flow of base liquid and condensate through said chambers to maintain the maximum and minimum temperatures of condensate and base liquid at an approximately constant differential in each chamber, with the temperatures of the base liquid and condensate always close to but above and below, respectively, the enthalpy-temperature characteristic of a saturated mixture of the vaporized condensate and the carrier gas, to minimize heat losses in the process and to cause convection current in said carrier gas to carry vaporized liquid from the base portion of each chamber to the top portion thereof.

6. A liquid conversion system for producing a substantially purified condensate liquid from a base liquid containing impurities removable by vaporization comprising:

a series of at least three conversion chambers of successively diminishing volume each having a condensation section communicating with a vaporization section filled with a given carrier gas;

means for discharging previously purified condensate, in liquid state and at a relatively low temperature, into said condensation section of the first chamber;

means for collecting condensate from the condensation section of each chamber and for discharging the collected condensate into the condensation section of the next succeeding chamber in the series;

means for discharging base liquid, at a temperature just below the condensation temperature of the liquid, into the vaporization section of the last chamber in the series;

means for collecting liquid from the vaporization section of each chamber and for discharging the collected liquid into the vaporization section of the next preceding chamber of the series, a portion of the liquid evaporating in the vaporization section and being carried by said carrier gas to the condensation section of said chamber to condense on the condensate present therein and thereby increase the quantity of the condensate and the temperature of the condensate transferred to the next succeeding chamber;

and vent means permitting transfer of gas between all of said chambers to maintain a substantially constant pressure throughout the system.

7. A liquid conversion system for producing a substantially purified condensate liquid from a base liquid containing impurities removable by vaporization comprising:

a series of at least three conversion chambers comprising individual spray towers of successively diminishing volume each having a condensation section at the top thereof and a vaporization section at the bottom thereof and each being filled with a given carrier gas;

means for spraying previously purified condensate, in liquid state and at a relatively low temperature, into said condensation section of the first chamber in the series;

means for collecting the spray of condensate from the condensation section of each chamber and for spraying the collected condensate into the condensation section of the next succeeding chamber in the series;

means for spraying base liquid, at a temperature just below the condensation temperature of the liquid, into the vaporization section of the last chamber in the series;

means for collecting the spray of liquid from the vaporization section of each chamber and for spraying the collected liquid into the vaporization section of the next preceding chamber of the series, a portion of the liquid evaporating in the vaporization section and being carried by convection currents of said carrier gas to the condensation section of said chamber to condense on the spray of condensate present therein and thereby increase the quantity of the condensate and the temperature of the condensate transferred to the next succeeding chamber;

and vent means permitting transfer of gas between all of said chambers to maintain a substantially constant pressure throughout the system, said vent means including a series of vents interconnecting the condensation sections of the chambers to permit vapor-laden carrier gas to pass back through the series of condensation sections.

8. A liquid conversion system for producing fresh water from salt water comprising:

a series of at least three conversion chambers of successively diminishing volume each having a condensation section communicating with a vaporization section and each being filled with air;

a plurality of porous distributor baffles disposed in spaced stacked array in each of the condensation and vaporization sections of each chamber;

means for dispersing fresh water, in liquid state and at a relatively low temperature, over the distributor baffles in said condensation section of the first chamber, the fresh water passing down through the baffles and being distributed thereby through said condensation section;

means for collecting fresh water from the condensation section of each chamber and for dispersing the collected fresh water over the distributor baffles in the condensation section of the next succeeding chamber in the series;

means for dispersing salt water, at a temperature just below the condensation temperature of water, over the distributor baffles in the vaporization section of the last chamber in the series;

means for collecting salt water from the vaporization section of each chamber and for dispersing the collected salt water over the distributor baffles in the vaporization section of the next preceding chamber of the series, a portion of the water evaporating in the vaporization section and being carried by air currents to the condensation section of said chamber to condense on the fresh water present therein and thereby increase the quantity of the fresh water and the temperature of the fresh water transferred to the next succeeding chamber;

and means for maintaining a substantially constant and relatively low pressure throughout the system.

9. A distilling system for producing a substantially purified condensate from a base liquid containing impurities removable by vaporization comprising:

a series of at least three conversion chambers of successively varying volume each having a condensation section and a vaporization section and each filled with a given carrier gas;

means for discharging previously purified liquid condensate, at a relatively low temperature, into said condensation section of said first chamber;

means for collecting liquid condensate from the condensation section of each chamber and for discharging the collected liquid into the condensation section of the next succeeding chamber in the series;

inlet means for discharging base liquid, at a temperature just below the condensation temperature of the liquid, into the vaporization section of the last chamber in the series;

means for collecting liquid from the vaporization section of each chamber and for discharging the collected liquid into the vaporization section of the next preceding chamber of the series, a portion of the liquid evaporating in the vaporization section and being carried by said carrier gas to the condensation section of said chamber to condense with the condensate present therein and thereby increase the quantity of the condensate and the temperature of the condensate transferred to the next succeeding chamber;

and heat excahnger means connected to the condensation section of the last chamber in the series and to the base liquid inlet means, for utilizing the increased heat content of the condensate from said last chamber to pre-heat the incoming base liquid.

10. A liquid conversion system for producing fresh water from salt water, comprising:

a series of at least three conversion chambers of successively diminishing volume each having a condensation section communicating with a vaporization section, all of said chambers being filled with air at approximately atmospheric pressure;

means for dispersing relatively cold fresh water into said condensation section of said first chamber;

means for collecting fresh water from the condensation section of each chamber and for dispersing the collected fresh water in the condensation section of the next succeeding chamber in the series;

means, including a salt water inlet for dispersing salt water, at a temperature just below the boiling point for water, into the vaporization section of the last chamber in the series;

means for collecting salt water from the vaporization section of each chamber and for discharging the collected salt water into the vaporization section of the next preceding chamber of the series, a portion of the water evaporating in the vaporization section and being carried by air currents within the chamber to the condensation section of said chamber to condense on the colder fresh water present therein and thereby increase the quantity of the fresh water and the temperature of the fresh water transferred to the next succeeding chamber;

vent means permitting transfer of air between all of said chambers to maintain a substantially constant pressure throughout the system;

a fresh water outlet connected to the condensation section of the last chamber in the series;

and a heat exchanger, connected to said fresh water outlet and said salt water inlet, for heating the incoming salt water by transfer of heat thereto from the outgoing fresh water.

References Cited in the file of this patent
UNITED STATES PATENTS

| 1,546,345 | 7/25 | Laird | 202—48 |
| 1,782,959 | 11/30 | Elliott | 202—172 |
| 1,918,638 | 7/33 | Gensecke | 202—185.2 |
| 2,018,049 | 10/35 | Allen | 202—236 |
| 2,368,665 | 2/45 | Kohman et al. | 202—49 |
| 2,803,589 | 8/57 | Thomas | 202—75 |
| 2,908,618 | 10/59 | Bethon | 202—75 |

OTHER REFERENCES

German application K 24,930 Ia/17, December 1956.

ROBERT F. BURNETT, *Primary Examiner.*

GEORGE D. MITCHELL, *Examiner.*